US012407663B2

(12) United States Patent
Shibata

(10) Patent No.: US 12,407,663 B2
(45) Date of Patent: Sep. 2, 2025

(54) NON-TRANSITORY COMPUTER-READABLE RECORDING MEDIUM STORING COMPUTER-READABLE INSTRUCTIONS FOR TERMINAL DEVICE AND COMMUNICATION DEVICE

(71) Applicant: BROTHER KOGYO KABUSHIKI KAISHA, Nagoya (JP)

(72) Inventor: Hiroshi Shibata, Yatomi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 143 days.

(21) Appl. No.: 17/328,160

(22) Filed: May 24, 2021

(65) Prior Publication Data

US 2021/0377024 A1    Dec. 2, 2021

(30) Foreign Application Priority Data

May 29, 2020  (JP) ................................ 2020-094817

(51) Int. Cl.
*H04L 29/06* (2006.01)
*H04L 9/30* (2006.01)
(Continued)

(52) U.S. Cl.
CPC ............ *H04L 63/08* (2013.01); *H04L 9/3006* (2013.01); *H04L 9/3263* (2013.01); *H04W 76/11* (2018.02)

(58) Field of Classification Search
CPC ..... H04L 9/3006; H04L 9/3263; H04L 41/12; H04L 41/22; H04L 61/30; H04L 61/5014;
(Continued)

(56) References Cited

U.S. PATENT DOCUMENTS

2016/0254916 A1* 9/2016 Miyake ............... H04L 63/0823
713/175
2016/0337532 A1   11/2016 Ren
(Continued)

FOREIGN PATENT DOCUMENTS

CN     110324825 A    10/2019
CN     110692280 B     6/2023
(Continued)

OTHER PUBLICATIONS

Scott Jordan, Gwen Shaffer; "User and ISP Rights of Device Attachment and Device Management"; ACM Transactions on Internet Technology, vol. 13, No. 2, Article 6, Publication date: Dec. 2013; pp. 1-20 (Year: 2013).*
(Continued)

*Primary Examiner* — Shewaye Gelagay
*Assistant Examiner* — Courtney D Fields
(74) *Attorney, Agent, or Firm* — Scully, Scott, Murphy & Presser, P.C.

(57) ABSTRACT

A first terminal device may receive first address information which is a first IP address of the first communication device from the first communication device by using a communication network to which the first terminal device and a first communication device belong, and a first public key of the first communication device. The first terminal device may send a first authentication request in which the first public key is used to the first communication device with the first address information as a destination, and send first connection information to the first communication device with the first address information as a destination in a case where a first authentication response is received from the first communication device. The first connection information may be used by the first communication device to establish a first
(Continued)

wireless connection between the first communication device and an external device.

20 Claims, 5 Drawing Sheets

(51) Int. Cl.
| | | |
|---|---|---|
| *H04L 9/32* | (2006.01) | |
| *H04L 9/40* | (2022.01) | |
| *H04W 12/00* | (2021.01) | |
| *H04W 76/11* | (2018.01) | |
| *H04W 12/04* | (2021.01) | |
| *H04W 12/06* | (2021.01) | |
| *H04W 48/16* | (2009.01) | |

(58) Field of Classification Search
CPC ..... H04L 67/34; H04L 63/08; H04L 61/5007; H04W 76/11; H04W 8/005; H04W 12/06; H04W 12/35; H04W 12/50; H04W 4/50; H04W 12/0431; H04W 76/10; G06F 9/4411

See application file for complete search history.

(56) References Cited

U.S. PATENT DOCUMENTS

| | | |
|---|---|---|
| 2018/0077255 A1 | 3/2018 | Goto |
| 2019/0303071 A1 | 10/2019 | Tsuji |
| 2019/0313246 A1 | 10/2019 | Nix |
| 2020/0104081 A1 | 4/2020 | Miyake |
| 2020/0146101 A1 | 5/2020 | Tsuboi |
| 2021/0195410 A1 | 6/2021 | Goto |
| 2021/0208829 A1 | 7/2021 | Miyake |
| 2021/0235516 A1 | 7/2021 | Wang |
| 2021/0377024 A1 | 12/2021 | Shibata |
| 2021/0378034 A1 | 12/2021 | Shibata |
| 2023/0101277 A1 | 3/2023 | Miyake |

FOREIGN PATENT DOCUMENTS

| | | | | |
|---|---|---|---|---|
| EP | 3547731 A1 | * | 10/2019 | ........... G06F 3/1222 |
| JP | 2018046435 A | | 3/2018 | |
| JP | 2020053934 A | | 4/2020 | |
| JP | 2020072442 A | | 5/2020 | |
| WO | 2020054365 A1 | | 3/2020 | |

OTHER PUBLICATIONS

Device Provisioning Protocol Specification Version 1.1.13, created by the Wi-Fi Alliance.
Anonymous, "DRAFT Device Provisioning Protocol Specification Version 1.2", Wi-Fi Alliance, Mar. 3, 2020, pp. 1-174.
extended European Search Report dated Sep. 10, 2021 from related EP 21176415.4.
Extended European Search report dated Sep. 10, 2021 received in European Patent Application No. EP 21176416.2.
Notice of Reasons for Refusal dated Feb. 20, 2024 received in Japanese Patent Application No. JP 2020-094818.
Office Action dated Apr. 24, 2023 received in U.S. Appl. No. 17/328,420.

* cited by examiner

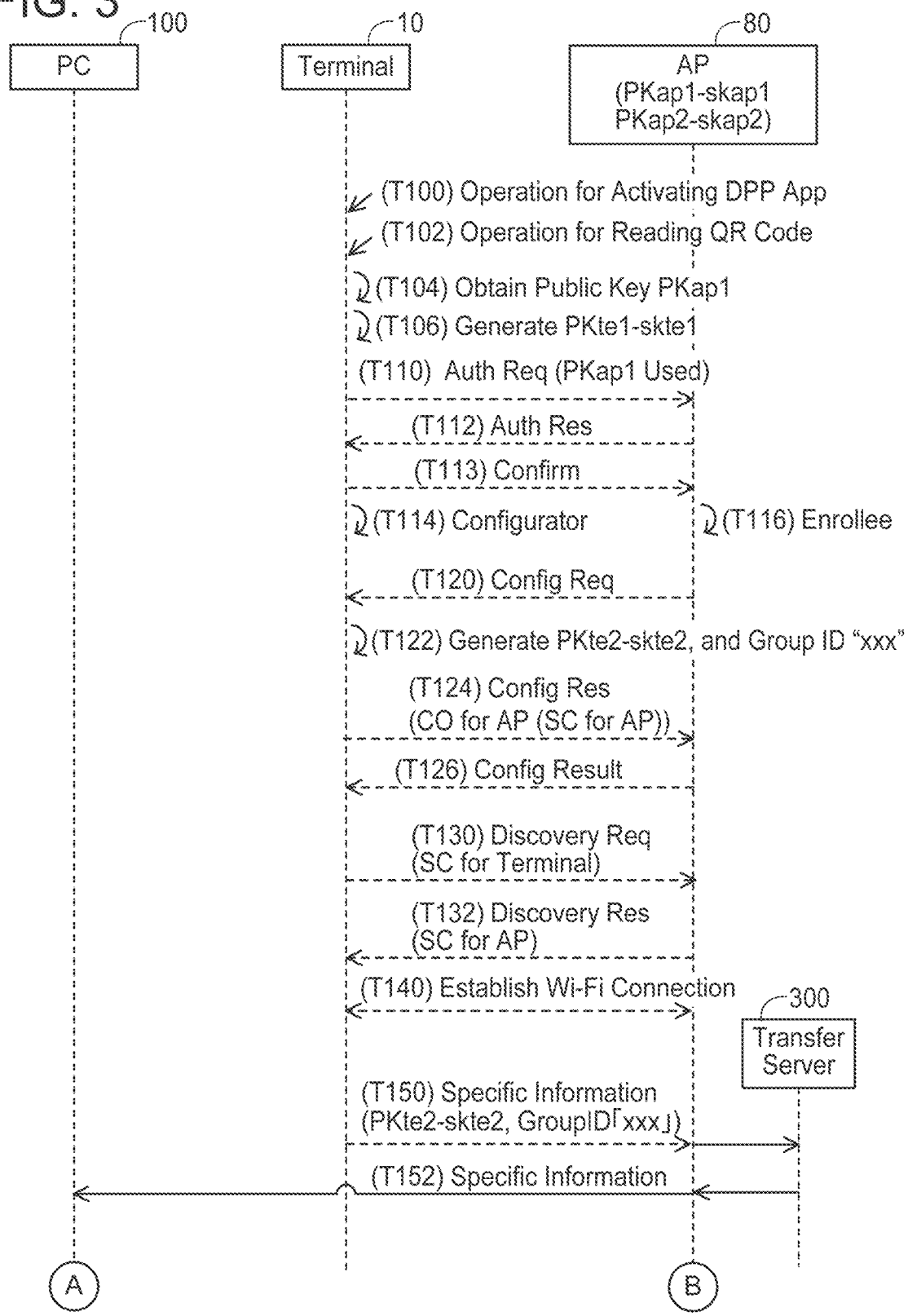

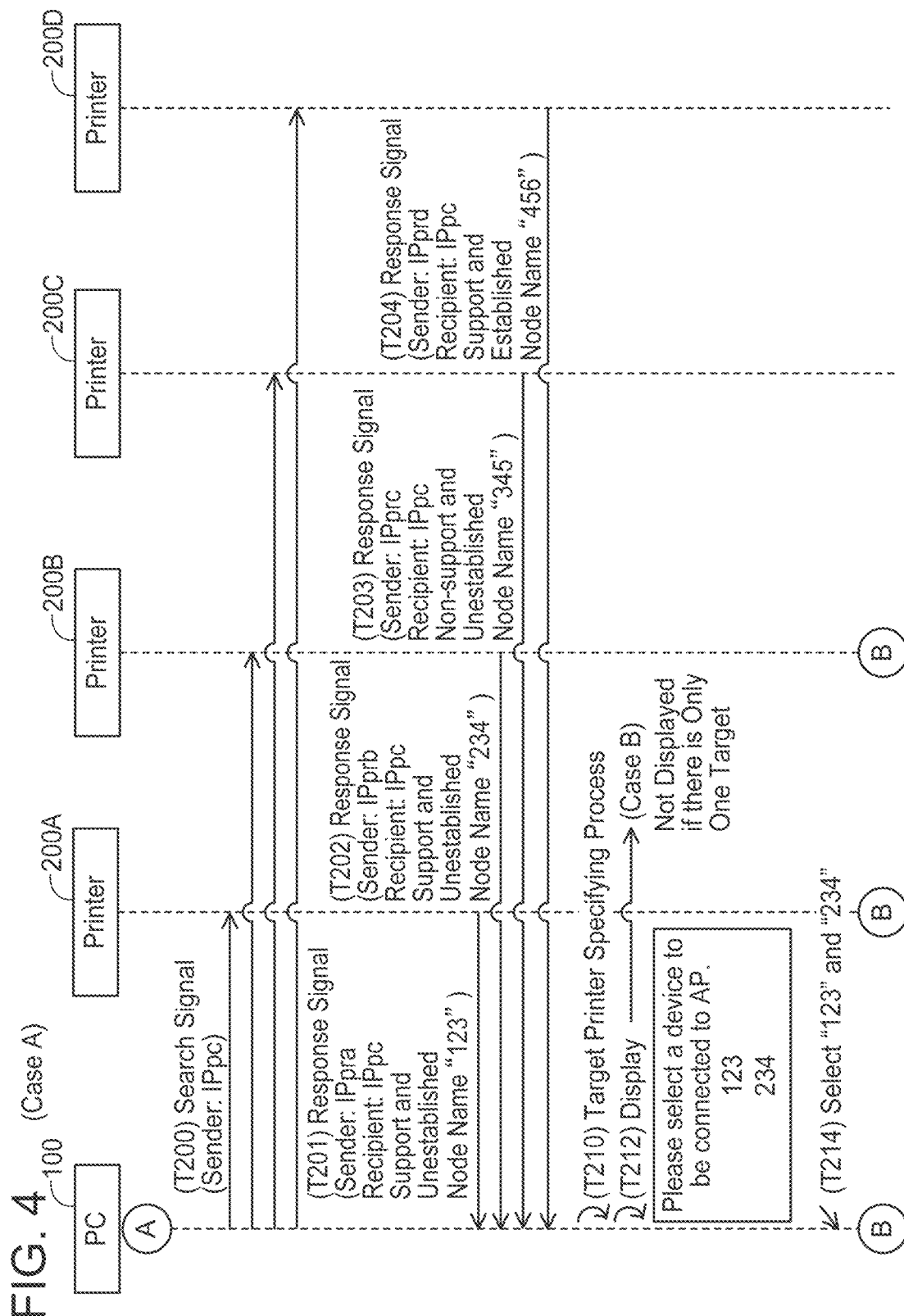

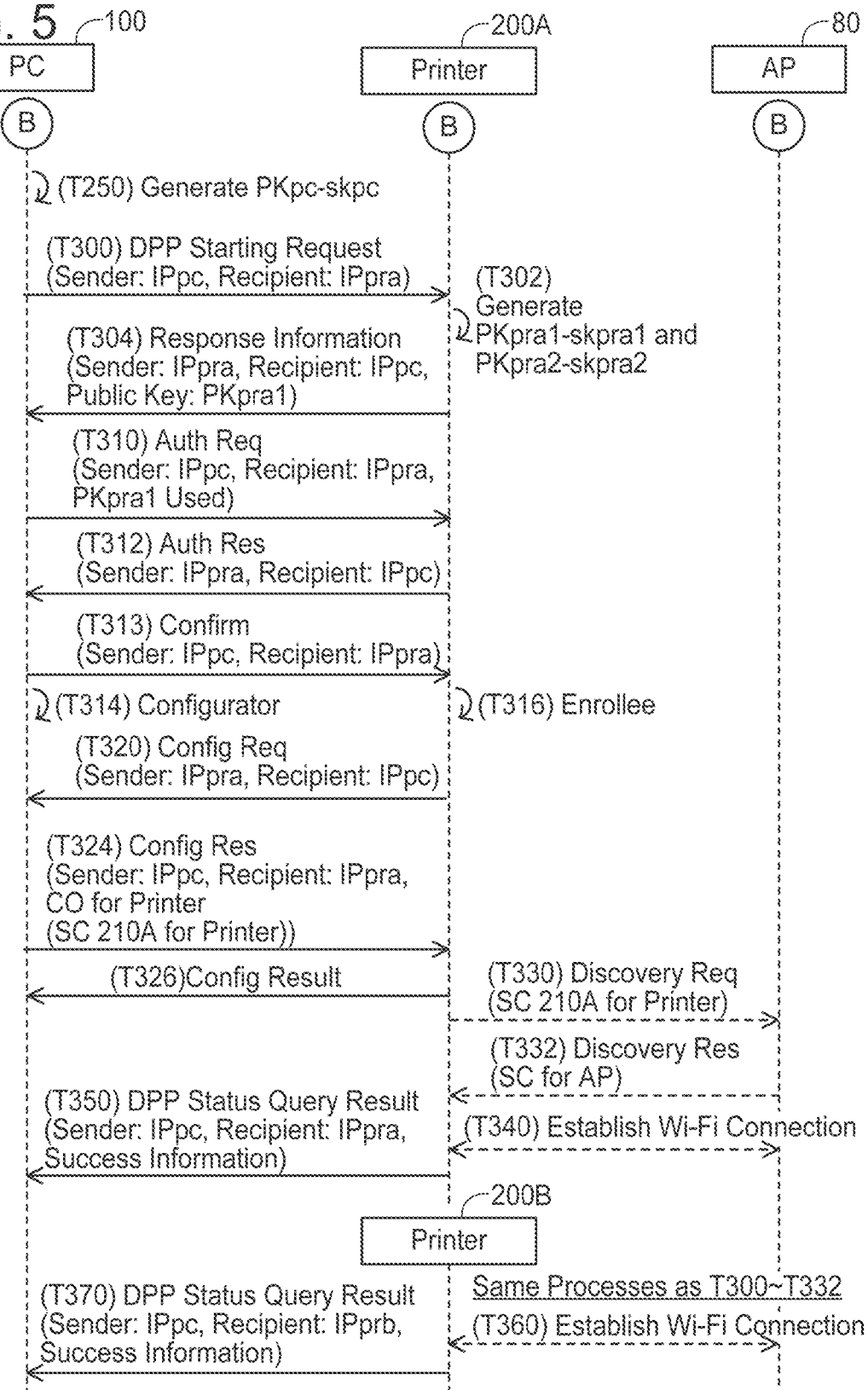

NON-TRANSITORY COMPUTER-READABLE RECORDING MEDIUM STORING COMPUTER-READABLE INSTRUCTIONS FOR TERMINAL DEVICE AND COMMUNICATION DEVICE

CROSS-REFERENCE

This application claims priority to Japanese Patent Application No. 2020-094817, filed on May 29, 2020, the entire contents of which are incorporated herein by reference.

TECHNICAL FIELD

The disclosure herein discloses art that is used when a wireless connection is to be established between a communication device and an external device.

BACKGROUND ART

A technique of establishing a Wi-Fi connection between a pair of devices according to a Device Provisioning Protocol (DPP) scheme of a Wi-Fi standard is known. Especially, the document describes that Authentication and the like can be executed by wired communication using an IP address.

The above document describes details of Authentication in wired communication using an IP address, however, it does not describe in detail other types of communication using an IP address.

SUMMARY

The disclosure herein discloses art that enables communication to be suitably executed using address information between a terminal device and a communication device in a situation in which a wireless connection is to be established between the communication device and an external device.

The disclosure herein discloses a non-transitory computer-readable recording medium storing computer-readable instructions for a first terminal device. The first terminal device may comprise one or more communication interfaces and a processor. The computer-readable instructions, when executed by the processor of the first terminal device, may cause the first terminal device to: by using a communication network to which the first terminal device and a first communication device belong, receive first address information which is a first IP address of the first communication device from the first communication device via a first communication interface of the one or more communication interfaces; receive a first public key of the first communication device from the first communication device via the first communication interface by using the communication network; in a case where the first address information and the first public key are received from the first communication device, send a first authentication request in which the first public key is used to the first communication device with the first address information as a destination via the first communication interface by using the communication network; and in a case where a first authentication response is received from the first communication device via the first communication interface by using the communication network in response to the first authentication request being sent to the first communication device, send first connection information to the first communication device with the first address information as a destination via the first communication interface by using the communication network, wherein the first connection information is used by the first communication device to establish a first wireless connection between the first communication device and an external device.

The disclosure herein also discloses another non-transitory computer-readable recording medium storing computer-readable instructions for a first terminal device. The first terminal device may comprise one or more communication interfaces and a processor. The computer-readable instructions, when executed by the processor of the first terminal device, may cause the first terminal device to: by using a communication network to which the first terminal device and a first communication device belong, receive first address information from the first communication device via a first communication interface of the one or more communication interfaces; in a case where the first address information is received from the first communication device, send a first sending request to the first communication device with the first address information as a destination via the first communication interface by using the communication network, wherein the first sending request is a signal for requesting the first communication device to send a first public key of the first communication device; in response to the first sending request being sent to the first communication device, receive the first public key from the first communication device via the first communication interface by using the communication network; in a case where the first public key is received from the first communication device, send a first authentication request in which the first public key is used to the first communication device via a second communication interface of the one or more communication interfaces; and in a case where a first authentication response is received from the first communication device via the second communication interface in response to the first authentication request being sent to the first communication device, send first connection information to the first communication device via the second communication interface, wherein the first connection information is used by the first communication device to establish a first wireless connection between the first communication device and an external device.

The disclosure herein also discloses a communication device comprising one or more communication interfaces; and a controller. The controller may be configured to: by using a communication network to which the communication device and a terminal device belong, send address information which is an IP address of the communication device to the terminal device via a first communication interface of the one or more communication interfaces; send a public key of the communication device to the terminal device via the first communication interface by using the communication network; in a case where the address information and the public key are sent to the terminal device, receive an authentication request in which the public key is used from the terminal device via the first communication interface by using the communication network, wherein the authentication request is sent with the address information as a destination; in a case where the authentication request is received from the terminal device, send an authentication response to the terminal device via the first communication interface by using the communication network; in a case where the authentication response is sent to the terminal device, receive connection information from the terminal device via the first communication interface by using the communication network, wherein the connection information is sent with the address information as a destination, and wherein the connection information is used by the communication device to establish a wireless connection between the communication device and an external device; and in a case where the connection information is received from the terminal device, establish the wireless connection between the communication device and the external device by using the connection information via a third communication interface of the one or more communication interfaces.

The disclosure herein also discloses another communication device comprising one or more communication interfaces and a controller. The controller may be configured to: by using a communication network to which the communication device and a terminal device belong, send address information of the communication device to the terminal device via a first communication interface of the one or more communication interfaces; in a case where the address information is sent to the terminal device, receive a sending request from the terminal device via the first communication interface by using the communication network, wherein the sending request is sent with the address information as a destination, and wherein the sending request is a signal for requesting the communication device to send a public key of the communication device; in response to the sending request being received from the terminal device, send the public key to the terminal device via the first communication interface by using the communication network; in a case where the public key is sent to the terminal device, receive an authentication request in which the public key is used from the terminal device via a second communication interface of the one or more communication interfaces; in response to the authentication request being received from the terminal device, send an authentication response to the terminal device via the second communication interface; in a case where the authentication response is sent to the terminal device, receive connection information from the terminal device via the second communication interface, wherein the connection information is used by the communication device to establish a wireless connection between the communication device and an external device; and in a case where the connection information is received from the terminal device, establish the wireless connection between the communication device and the external device by using the connection information via a third communication interface of the one or more communication interfaces.

A computer-readable recording medium storing the computer program for the first terminal device as above, the first terminal device itself, and a method implemented by the first terminal device are also novel and useful. Computer programs for the respective communication devices as above, computer-readable recording media storing these computer programs, and methods implemented by the communication devices as above are also novel and useful. Further, a communication system comprising two or more of the above-described devices (e.g., the first terminal device and the first communication device) is also novel and useful.

BRIEF DESCRIPTION OF THE DRAWINGS

FIG. 3 shows a sequence diagram of processes executed by the respective devices;
FIG. 4 shows a sequence diagram continuing from FIG. 3;
and
FIG. 5 shows a sequence diagram continuing from FIG. 4.

EMBODIMENT (Configuration of Communication System 2: FIG. 1)
As shown in FIG. 1, a communication system 2 includes a terminal 10, an access point (AP) 80, a personal computer (PC) 100, and a plurality of printers 200A to 200D.

The terminal 10, the AP 80, the PC 100, and the printers 200C, 200D are in a company XXX. The terminal 10 and the PC 100 are used by a network administrator of the company XXX. Cables are connected to the AP 80, the PC 100, and the printer 200C. That is, the AP 80, the PC 100, and the printer 200C belong to a wired Local Area Network (LAN) 6. The printer 200D has been establishing a wireless connection according to Wi-Fi standard (hereinbelow termed "Wi-Fi connection") with the AP 80. That is, the printer 200D belongs to a wireless LAN 8 formed by the AP 80. The AP 80 and the PC 100 are connected to the Internet 4.

The printers 200A and 200B are purchased by the company XXX and delivered to the company XXX. The present embodiment describes a situation in which Wi-Fi connections are to be established between each of the printers 200A, 200B and the AP 80 by using the terminal 10 and the PC 100.

Figure 1:
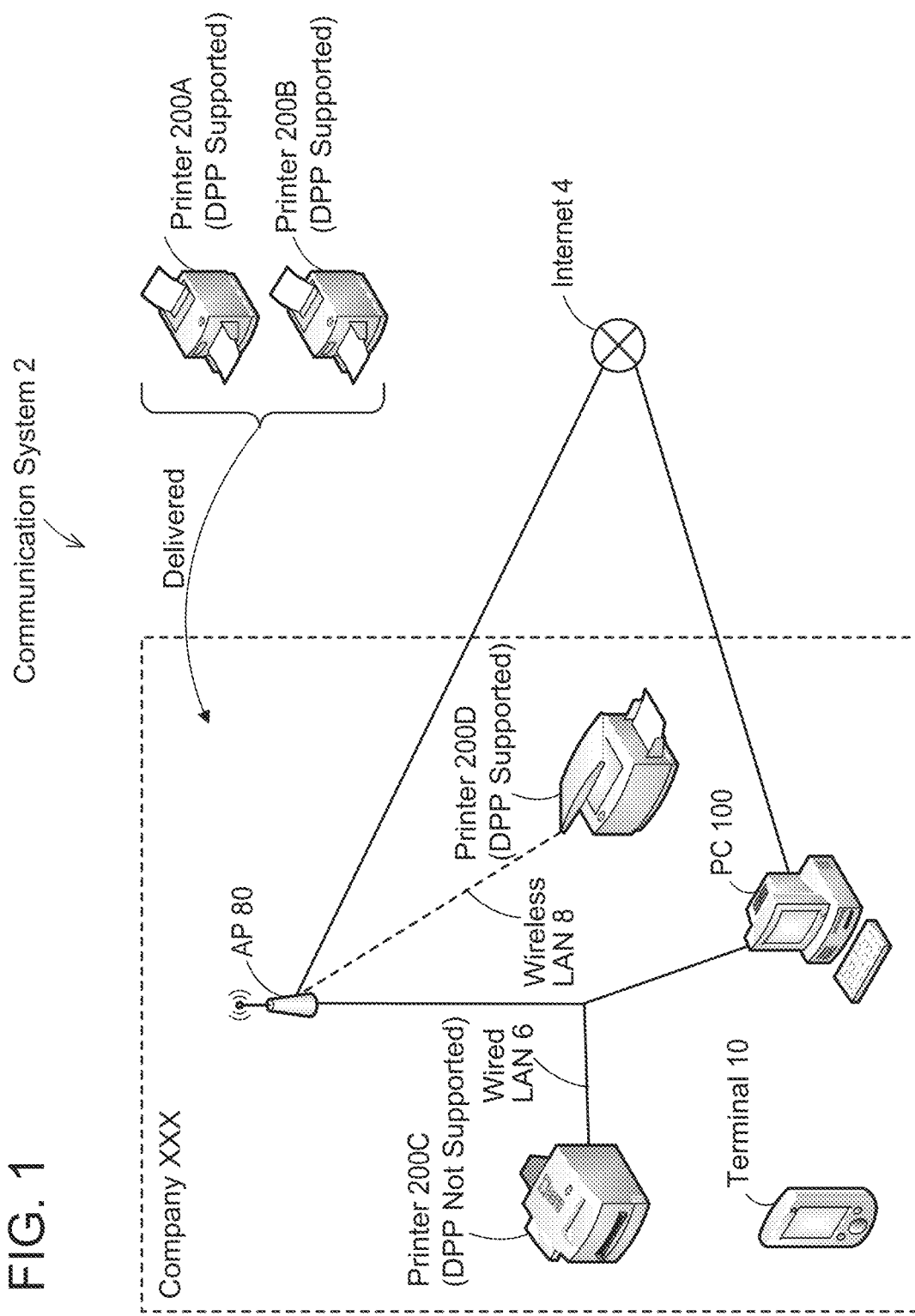
FIG. 1 shows a configuration of a communication system.
Figure 2:
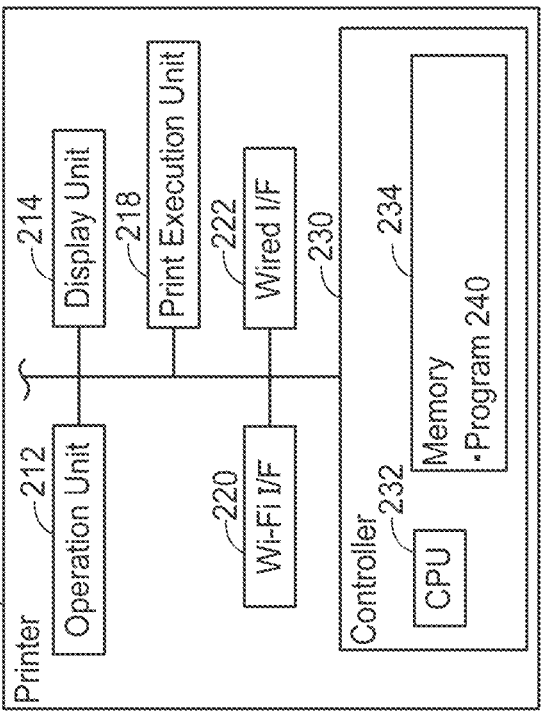
FIG. 2 shows hardware configurations of respective devices.
Figure 2:
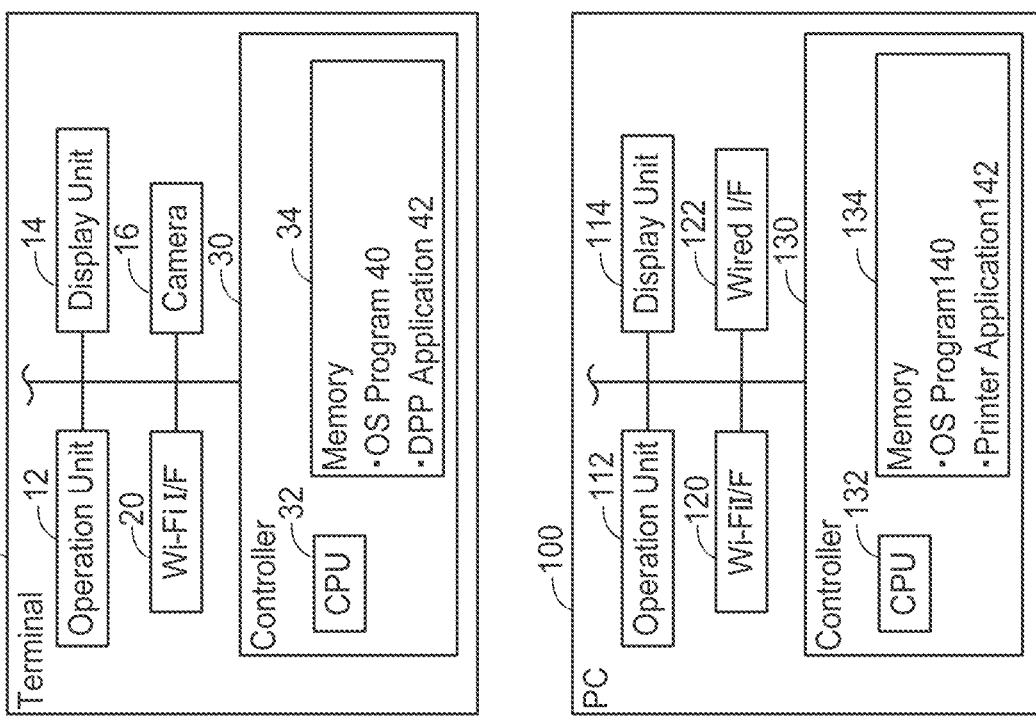

(Configuration of Terminal 10: FIG. 2)
Next, hardware configurations of the respective devices 10, 100, and 200A will be described with reference to FIG. 2. The terminal 10 is a portable terminal device such as a portable phone (e.g., smartphone), a PDA, a tablet PC, or the like. The terminal 10 includes an operation unit 12, a display unit 14, a camera 16, a Wi-Fi interface 20, and a controller 30. The respective units 12 to 30 are connected to a bus line (reference sign omitted).

The operation unit 12 includes a plurality of keys. A user can input various instructions to the terminal 10 by operating the operation unit 12. The display unit 14 is a display configured to display various types of information. The camera 16 is a device configured to capture images of objects. In the present embodiment, the camera 16 is used to capture a QR code (registered trademark) of the AP 80.

The Wi-Fi interface 20 is a wireless interface configured to execute Wi-Fi communication according to the Wi-Fi standard. The Wi-Fi standard is a wireless communication standard for executing wireless communication according to standard 802.11 and standards complying therewith (e.g., 802.11a, 11b, 11g, 11n, 11ac, etc.) of the IEEE (the Institute of Electrical and Electronics Engineers, Inc.), for example Especially, the Wi-Fi interface 20 supports a Device Provisioning Protocol (DPP) scheme established by the Wi-Fi Alliance. Details of the DPP scheme are described in the standard "Device Provisioning Protocol Specification Version 1.1.13" created by the Wi-Fi Alliance.

The controller 30 includes a CPU 32 and a memory 34. The CPU 32 is configured to execute various processes according to programs 40 and 42 stored in the memory 34. The memory 34 is configured of a volatile memory, a nonvolatile memory, and the like. The Operating System (OS) program 40 is a program for implementing basic operations of the terminal 10. The DPP application 42 (hereinbelow termed "DPP app 42") is a program for establishing a Wi-Fi connection between the terminal 10 and the AP 80 according to the DPP scheme. The DPP app 42 is installed in the terminal 10, for example, from a server (not shown) on the Internet provided by a vendor of the printer 200A or the like.

(Configuration of PC 100)
The PC 100 is a stationary terminal device such as a desktop PC or the like. In a variant, the PC 100 may be a portable terminal device such as a notebook PC or the like. The PC 100 includes an operation unit 112, a display unit 114, a Wi-Fi interface 120, a wired interface 122, and a controller 130. The respective units 112 to 130 are connected to a bus line (reference sign omitted).

The operation unit 112 includes a plurality of keys. The user can input various instructions to the PC 100 by operating the operation unit 112. The display unit 114 is a display configured to display various types of information. The Wi-Fi interface 120 is a wireless interface configured to execute Wi-Fi communication and supports the DPP scheme.

The controller 130 includes a CPU 132 and a memory 134. The CPU 132 is configured to execute various processes according to programs 140 and 142 stored in the memory 134. The memory 134 is configured of a volatile memory, a nonvolatile memory, and the like. The OS program 140 is a program for implementing basic operations of the PC 100. The printer application 142 (hereinbelow termed "printer app 142") is a program for searching for printers and establishing Wi-Fi connections between the printers 200A, 200B and the AP 80 according to the DPP scheme. The printer app 142 may be installed in the PC 100, for example, from the server (not shown) on the Internet provided by the vendor of the printer 200A or from a medium shipped with the printer 200A.

(Configuration of Printer 200A)

The printer 200A is a peripheral device (e.g., a peripheral device of the terminal 10) configured to execute a printing function. The printer 200A includes an operation unit 212, a display unit 214, a print execution unit 218, a Wi-Fi interface 220, a wired interface 222, and a controller 230. The respective units 212 to 230 are connected to a bus line (reference sign omitted).

The operation unit 212 includes a plurality of keys. The user can input various instructions to the printer 200A by operating the operation unit 212. The display unit 214 is a display configured to display various types of information. The print execution unit 218 includes a printing mechanism of inkjet scheme or laser scheme. The Wi-Fi interface 220 is a wireless interface configured to execute Wi-Fi communication and supports the DPP scheme.

The controller 230 includes a CPU 232 and a memory 234. The CPU 232 is configured to execute various processes according to a program 240 stored in the memory 234. The memory 234 is configured of a volatile memory, a nonvolatile memory, and the like.

Each of the printers 200B and 200D has the same hardware configuration as the printer 200A and supports the DPP scheme. The printer 200C has the same hardware configuration as the printer 200A but does not support the DPP scheme.

(Processes Executed by Respective Devices: FIGS. 3 to 5)

Next, processes executed by the devices 10, 80, 100, and 200A to 200D will be described with reference to FIGS. 3 to 5. Hereinbelow, for easier understanding, actions executed by the CPUs (e.g., the CPU 32) of the respective devices will be described with the respective devices (e.g., the terminal 10) as subjects of action instead of the CPUs as the subjects of action. Further, in FIGS. 3 to 5, wired communication and wireless communication between the devices are shown respectively by solid lines and broken lines.

(Establishing Wi-Fi Connection Between Terminal 10 and AP 80: FIG. 3)

As aforementioned, the printers 200A and 200B are delivered to the company XXX. In the company XXX, a Wi-Fi connection is established between the terminal 10 and the AP 80 before Wi-Fi connections are established between each of the printers 200A and 200B and the AP 80. Processes for establishing a Wi-Fi connection between the terminal 10 and the AP 80 will be described with reference to FIG. 3. In FIG. 3, every communication executed by the terminal 10 is executed via the Wi-Fi interface 20. Therefore, hereinbelow, a phrase "via the Wi-Fi interface 20" will be omitted in the explanation for the communication executed by the terminal 10.

In T100, the terminal 10 accepts an operation for activating the DPP app 42 from the user (i.e., the network administrator of the company XXX). Processes hereinbelow executed by the terminal 10 are all implemented by the DPP app 42.

The AP 80 has stored two sets of authentication information in advance. A first set of authentication information includes a first public key PKap1 and a first private key skap1 corresponding thereto (i.e., the private key skap1 paired with the public key PKap1). A second set of authentication information includes a second public key PKap2 and a second private key skap2 corresponding thereto. A QR code is attached to a housing of the AP 80. The QR code is generated by coding information such as the first public key PKap1 of the AP 80, a MAC address of the AP 80, and the like. In T102, the terminal 10 accepts, from the user, an operation for reading the QR code with the camera 16.

In T104, the terminal 10 reads and decode the QR code. The terminal 10 thereby obtains the information such as the first public key PKap1 of the AP 80, the MAC address of the AP 80, and the like. The process of T104 corresponds to Bootstrapping of the DPP scheme.

In T106, the terminal 10 generates a first set of authentication information of the terminal 10 by using a MAC address of the Wi-Fi interface 20. This authentication information includes a first public key PKte1 and a first private key skte1 corresponding to the first public key PKte1.

In T110, the terminal 10 sends an Authentication Request in which the first public key PKap1 obtained in T104 is used to the AP 80 with the MAC address of the AP 80 obtained in T104 as its destination. Hereinbelow, Authentication will be termed "Auth" and Request will be termed "Req". The Auth Req is a signal requesting execution of authentication. Specifically, the terminal 10 firstly generates a first shared key by using the first public key PKap1 obtained in T104 and the first private key skte1 generated in T106 and then generates first encrypted data by encrypting a random value using the first shared key. Then, the terminal 10 sends the Auth Req including the first public key PKte1 generated in T106, the first encrypted data, and a Capability of the terminal 10 to the AP 80. The Capability of the terminal 10 includes a value indicating that the terminal 10 is capable of operating only as a Configurator of the DPP scheme.

The above Auth Req is communication in which the physical layer and the data link layer of the Open Systems Interconnection (OSI) model are used but the network layer and the higher layers than that are not used, that is, communication that does not use an IP address. Until a Wi-Fi connection is established between the terminal 10 and the AP 80 (i.e., until communication in T132 (to be described later)), the communication that does not use an IP address is executed between the terminal 10 and the AP 80.

When receiving the Auth Req from the terminal 10 in T110, the AP 80 executes authentication for the Auth Req. Specifically, the AP 80 generates a first shared key by using the first public key PKte1 included in the Auth Req and the first private key skap1 stored in advance and then decrypts the first encrypted data using this first shared key. When the decryption of the first encrypted data is successful, that is, when the authentication for the Auth Req is successful, the AP 80 executes processes from T112.

When the authentication for the Auth Req is successful, the AP 80 generates a second shared key by using the first public key PKte1 included in the Auth Req and the second private key skap2 stored in advance and then generates second encrypted data by encrypting a random value using the second shared key. Then, in T112, the AP 80 sends an Auth Response including the second public key PKap2 stored in advance, the second encrypted data, and a Capability of the AP 80 to the terminal 10. Hereinbelow, Response will be termed "Res". The Capability of the AP 80 includes a value indicating that the AP 80 is capable of operating only as an Enrollee of the DPP scheme.

When receiving the Auth Res from the AP 80 in T112, the terminal 10 executes authentication for the Auth Res. Specifically, the terminal 10 generates a second shared key by using the second public key PKap2 included in the Auth Res and the first private key skte1 generated in T106 and then decrypts the second encrypted data by using this second shared key. When the decryption of the second encrypted data is successful, that is, when the authentication for the Auth Res is successful, the terminal 10 executes processes from T113.

Further, the terminal 10 determines that the Capability of the AP 80 included in the Auth Res (i.e., Enrollee) is not incompatible with the Capability of the terminal 10 (i.e., Configurator). In this case, in T113, the terminal 10 sends the AP 80 a Confirm indicating that the authentication was successful and their roles are not incompatible. Then, in T114, the terminal 10 determines to operate as the Configurator. The Configurator is a device that serves a role of sending a Configuration Object (hereinbelow termed "CO") (to be described later) to the Enrollee.

When receiving the Confirm from the terminal 10 in T113, the AP 80 determines to operate as the Enrollee in T116. The Enrollee is a device that serves a role of receiving a CO from the Configurator. The processes of T110 to T116 correspond to Auth in the DPP scheme.

In T120, the AP 80 sends a Configuration Req to the terminal 10. Hereinbelow, Configuration will be termed "Config". The Config Req is a signal requesting sending of a CO.

When receiving the Config Req from the AP 80 in T120, the terminal 10 generates a second set of authentication information of the terminal 10 by using the MAC address of the Wi-Fi interface 20 in T122. This authentication information includes a second public key PKte2 and a second private key skte2 corresponding to the second public key PKte2. The terminal 10 further generates a Group ID "xxx". The Group ID "xxx" is information for identifying the wireless LAN 8 formed by the AP 80.

Next, the terminal 10 generates a CO for AP. Specifically, the terminal 10 firstly generates a Signed Connector for AP which is information to be used by the AP 80 to establish a Wi-Fi connection. Hereinbelow, Signed Connector will be termed "SC". The SC for AP includes, for example, the second public key PKap2 included in the Auth Res received in T112, the Group ID "xxx" generated in T122, and an electronic signature obtained by using the second private key skte2 generated in T122. Then, the terminal 10 generates a CO for AP including the SC for AP and the second public key PKte2 generated in T122, and sends a Config Res including the CO for AP to the AP 80 in T124.

When receiving the Config Res from the terminal 10 in T124, the AP 80 sends a Config Result indicating that the CO for AP was received to the terminal 10 in T126. The processes of T120 to T126 correspond to Config of the DPP scheme.

Next, the terminal 10 generates an SC for terminal which is information to be used by the terminal 10 to establish a Wi-Fi connection. The SC for terminal includes, for example, the second public key PKte2 generated in T122, the Group ID "xxx" that is the same as the Group ID included in the SC for AP, and the electronic signature obtained by using the second private key skte2 generated in T122. Then, in T130, the terminal 10 sends a Discovery Req including the SC for terminal to the AP 80. The Discovery Req is a signal requesting sending of an SC of the communication counterpart.

When receiving the Discovery Req from the terminal 10 in T130, the AP 80 executes authentication for the Discovery Req. Specifically, the AP 80 uses the second public key PKte2 included in the CO for AP to decrypt the electronic signature included in the SC for terminal. When the authentication for the SC for terminal is successful in response to the decryption of the electronic signature, the AP 80 generates a connection key by using the second public key PKte2 included in the CO for AP and the second private key skap2 stored in advance. Then, in T132, the AP 80 sends a Discovery Res indulging an SC for AP to the terminal 10.

When receiving the Discovery Res from the AP 80 in T132, the terminal 10 executes authentication for the Discovery Res. Specifically, terminal 10 uses the second public key PKte2 generated in T122 to decrypt the electronic signature included in the SC for AP. When the authentication for the SC for AC is successful in response to the decryption of the electronic signature, the terminal 10 generates a connection key by using the second public key PKap2 included in the SC for AP and the second private key skte2 generated in T122. This generated connection key is the same as the connection key generated by the AP 80. That is, the connection key is shared between the terminal 10 and the AP 80. The processes of T130 and T132 correspond to Network Access of the DPP scheme.

Next, the terminal 10 executes 4-way handshape communication with the AP 80 using the connection key. As a result, a Wi-Fi connection is established between the terminal 10 and the AP 80 in T140. Thus, the terminal 10 joins the wireless LAN 8 formed by the AP 80 as a child station. As a result, the terminal 10 and the AP 80 can mutually execute communication using the network layer and the higher layers of the OSI model, that is, communication using an IP address.

After that, according to an instruction from the user, the terminal 10 sends in T150 specific information to a transfer server 300 on the Internet 4 via the AP 80 using the Wi-Fi connection established in T140. The specific information includes the pieces of information generated in T122 (i.e., the second public key PKte2, the second private key skte2, and the Group ID "xxx").

In T152, according to an instruction from the user, the PC 100 receives the specific information from the transfer server 300 via the AP 80 using the printer app 142. Since the transfer server 300 is used, the communication of the specific information can be executed securely. The wired LAN 6 is used in communication between the PC 100 and the AP 80. Since the PC 100 receives the specific information from the terminal 10, it operates as the Configurator instead of the terminal 10 in processes to be described below, and thus it can cause Wi-Fi connections to be established between each of the printers 200A, 200B and the AP 80 by using the specific information.

(Specifying Target Printer: FIG. 4)

Next, processes by which the PC 100 specifies at least one target printer (in the present case, 200A and 200B), which is a printer between which and the printer 80 a Wi-Fi connection is to be established, from among the printers 200A to 200D will be described with reference to FIG. 4. Each process hereinbelow executed by the PC 100 is implemented by the DPP app 42.

In FIGS. 4 and 5, every communication executed by the PC 100 is executed via the wired interface 122. Therefore, hereinbelow, the phrase "via the wired interface 122" will be omitted in the explanation for the communication executed by the PC 100. In FIG. 4, every communication executed by the printers 200A to 200C is executed via their wired interfaces (e.g., 222). Therefore, regarding FIG. 4, a phrase "via the wired interface" will be omitted in the explanation for the communication executed by the printers 200A to 200C. Further, every communication executed by the printer 200D is executed via its Wi-Fi interface. Therefore, a phrase "via the Wi-Fi interface" will be omitted in the explanation for the communication executed by the printer 200D. Communication between the PC 100 and the printer 200D includes wired communication between the PC 100 and the AP 80 and wireless communication between the AP 80 and the printer 200D. However, in FIG. 4, the communication between the PC 100 and the printer 200D is depicted with solid lines.

When the printers 200A and 200B are delivered to the company XXX, the printers 200A and 200B are connected to the wired LAN 6. As a result, the PC 100 and each of the printers 200A to 200D can mutually execute communication using the network layer and the higher layers of the OSI model, that is, communication using an IP address. The IP address of each of the PC 100 and the printers 200A to 200D may be a so-called static IP address that is set by the user or an IP address assigned by an IP address assigning server such as a Dynamic Host Configuration Protocol (DHCP) server.

In T200, the PC 100 sends the wired LAN 6 a search signal including the IP address IPpc of the PC 100 as a sender address. The search signal is a signal that does not designate a specific IP address as its recipient address, that is, it is a broadcast signal. The search signal is a signal according to Simple Network Management Protocol (SNMP) and requests sending of information indicating whether the DPP scheme is supported, information indicating whether a Wi-Fi connection with the AP 80 has already been established, and a node name of the recipient printer. In a variant, the search signal may, for example, be a multicast signal according to a multicast Domain Name System (mDNS). Further, in a variant, a serial number may be used instead of the node name.

When receiving the search signal from the PC 100 in T200, the printer 200A sends a response signal including the IP address IPpc of the PC 100 as a recipient address in T201. That is, the printer 200A sends the response signal to the PC 100 with the IP address IPpc as its destination. This response signal includes an IP address IPpra of the printer 200A as a sender address. This response signal further includes information indicating that the DPP scheme is supported (hereinbelow termed "support information"), information indicating that a Wi-Fi connection with the AP 80 has not been established yet (hereinbelow termed "unestablished information"), and a node name "123" of the printer 200A.

Similarly, each of the printers 200B to 200D sends a response signal to the PC 100 in T202 to T204. The response signal of the printer 200B (see T202) includes an IP address IPprb of the printer 200B as a sender address, the support information, the unestablished information, and a node name "234" of the printer 200B. The response signal of the printer 200C (see T203) includes an IP address IPprc of the printer 200C as a sender address, information indicating that the DPP is not supported (hereinbelow termed "non-support information"), the unestablished information, and a node name "345" of the printer 200C. The response signal of the printer 200D (see T204) includes an IP address IPprd of the printer 200D as a sender address, the support information, information indicating that a Wi-Fi connection with the AP 80 has already been established (hereinbelow termed "established information"), and a node name "456" of the printer 200D.

In T201 to T204, the PC 100 receives the response signals from the printers 200A to 200D, and thereby it obtains the pieces of information in the response signals (i.e., the IP addresses of the printers, the support information or the non-support information, the established information or the unestablished information, and the node names of the printers).

Then, in T210, the PC 100 specifies, from among the printers 200A to 200D, at least one target printer between which and the AP 80 a Wi-Fi connection is to be newly established. In Case A, the PC 100 specifies the printers 200A and 200B, which are the senders of the response signals including the support information and the unestablished information, as the target printers. The PC 100 does not specify the printer 200C, which is the sender of the response signal including the non-support information, as the target printer. Thus, the following processes executed to establish a Wi-Fi connection do not have to be executed for the printer 200C which cannot establish a Wi-Fi connection with the AP 80 according to the DPP scheme. Further, the PC 100 does not specify the printer 200D, which is the sender of the response signal including the established information, as the target printer. Thus, the following processes executed to establish a Wi-Fi connection do not have to be executed for the printer 200D which already has established the Wi-Fi connection with the AP 80.

In T212, the PC 100 causes the display unit 114 to display a selection screen including the node names "123" and "234" of the printers 200A and 200B specified in T210. The selection screen further includes a message prompting the user to select a device between which and the AP 80 a Wi-Fi connection is to be established. Owing to the selection screen being displayed, the user can select a printer between which and the AP 80 a Wi-Fi connection is to be established. In T214, the PC 100 accepts, from the user, an operation of selecting the two node names "123" and "234". When T214 is completed, the PC 100 proceeds to processes of FIG. 5 for establishing Wi-Fi connections between each of the printers 200A, 200B and the AP 80.

Here, Case B in which only the printer 200A among the printers 200A and 200B is connected to the wired LAN 6 will be assumed. In this case, the PC 100 does not receive the response signal in T202 and specifies only one printer 200A as the target printer in T210. In this case, the PC 100 does not display the selection screen (see T212) and proceeds to the processes of FIG. 5 without accepting the operation of selecting the node name. In this case, the processes for establishing a Wi-Fi connection between the printer 200B and the AP 80 are not executed, and only the processes for establishing a Wi-Fi connection between the printer 200A and the AP 80 are executed. When only one printer 200A is specified as the target printer, the processes for establishing a Wi-Fi connection between the printer 200A and the AP 80 are executed without the selection screen being displayed. Since the user does not have to select the printer 200A, user convenience is improved.

(Establishing Wi-Fi Connections Between Each of Printers 200A, 200B and AP 80: FIG. 5)

Next, processes continued from Case A of FIG. 4 will be described with reference to FIG. 5. The processes of FIG. 5 are for connecting each of the printers 200A and 200B to the AP 80 by using the PC 100.

In FIG. 5, every communication with the PC 100 executed by the printers 200A and 200B is executed via their wired interfaces (e.g., 222). Further, every communication with the AP 80 executed by the printers 200A and 200B is executed via their Wi-Fi interfaces (e.g., 220). Therefore, in FIG. 5, the phrases "via the wired interface" and "via the Wi-Fi interface" will be omitted in the explanation for the communication executed by the printers 200A and 200B.

Firstly in T250, the PC 100 uses a MAC address of the Wi-Fi interface 120 to generate authentication information of the PC 100. This authentication information includes a public key PKpc and a private key skpc corresponding to the public key PKpc.

Then, the PC 100 specifies the IP address IPpra included in the response signal received from the printer 200A (see T201) which has the node name "123" selected in T214 of FIG. 4. Then, in T300, the PC 100 sends the printer 200A a DPP starting request that includes the IP address IPpc as a sender address and the specified IP address IPpra as a recipient address. In the following processes as well, each signal from the PC 100 to the printer 200A includes the IP address IPpc as a sender address and the IP address IPpra as a recipient address, and thus the description for this point will be omitted hereinbelow. The DPP starting request is a signal requesting the printer 200A to start a process according to the DPP scheme.

By receiving the DPP starting request from the PC 100 in T300, the printer 200A obtains the IP address IPpc of the PC 100. Then, the printer 200A recognizes that the process according to the DPP scheme should be started, and in T302, the printer 200A uses a MAC address of the Wi-Fi interface 220 to generate a first set of authentication information and a second set of authentication information of the printer 200A. The first set of authentication information includes a first public key PKpra1 and a first private key skpra1 corresponding to the first public key PKpra1. The second set of authentication information includes a second public key PKpra2 and a second private key skpra2 corresponding to the second public key PKpra2. Further, the printer 200A shifts a state of the printer 200A from a state in which the printer 200A is unable to send an Auth Res in response to receiving an Auth Req to a state in which the printer 200A is able to send an Auth Res in response to receiving an Auth Req.

In T304, the printer 200A sends response information to the PC 100. The response information includes the IP address IPpra as a sender address and the obtained IP address IPpc as a recipient address. In the following processes as well, each signal from the printer 200A to the PC 100 includes the IP address IPpra as a sender address and the IP address IPpc as a recipient address, and thus the description for this point will be omitted hereinbelow. The response information further includes the first public key PKpra1 generated in T302.

By receiving the response information from the printer 200A in T304, the PC 100 obtains the first public key PKpra1. In this case, in T310, the PC 100 sends an Auth Req in which the first public key PKpra1 is used to the printer 200A. This Auth Req is the same as the Auth Req of T110 in FIG. 3 except that the first public key PKpra1 of the printer 200A and the authentication information of the PC 100 generated in T250 (i.e., the public key PKpc and the private key skpc) are used. The Capability of the PC 100 includes the value indicating that it is capable of operating only as the Configurator.

When receiving the Auth Req from the PC 100 in T310, the printer 200A executes authentication for the Auth Req. This authentication is the same as the authentication for the Auth Req in T110 of FIG. 3 except that the public key PKpc included in the Auth Req and the first private key skpra1 generated in T302 are used. Then, the printer 200A sends an Auth Res to the PC 100. This Auth Res is the same as the Auth Res of T112 in FIG. 3 except that the public key PKpc included in the Auth Req and the second set of authentication information generated in T302 (i.e., the second public key PKpra2 and the second private key skpra2) are used. The Capability of the printer 200A includes the value indicating that it is capable of operating only as the Enrollee.

When receiving the Auth Res from the printer 200A in T312, the PC 100 executes authentication for the Auth Res. This authentication is the same as the authentication for the Auth Res in T112 of FIG. 3 except that the second public key PKpra2 included in the Auth Res and the private key skpc generated in T250 are used. The following T313 to T320 are similar to T113 to T120 in FIG. 3.

When receiving the Config Req from the printer 200A in T320, the PC 100 generates a CO for printer. A method of generating this CO for printer is the same as the method of generating the CO for AP in response to the Config Req in T120 of FIG. 3. The CO for printer includes an SC 210A for printer and the second public key PKte2 received in T152 of FIG. 3. The SC 210A for printer includes, for example, the second public key PKpra2 included in the Config Req received in T320, the Group ID "xxx" received in T152 of FIG. 3, and an electronic signature obtained by using the second private key skte2 received in T152. Then, in T324, the PC 100 sends a Config Res including the CO for printer to the printer 200A. T326 is similar to T126 of FIG. 3.

T330 and T332 are the same as T130 and T132 of FIG. 3 except that the SC 210A for printer is used instead of the SC for terminal. Then, in T340, a Wi-Fi connection is established between the printer 200A and the AP 80. As a result, the printer 200A joins the wireless LAN 8, in which the AP 80 operates as a parent station, as a child station.

When the Wi-Fi connection with the AP 80 is established in T340, the printer 200A sends a Status Query Result (hereinbelow termed "Result") indicating that the establishment of the Wi-Fi connection has been completed to the PC 100 in T350 without going through the AP 80. Thereby, the completion of the establishment of the Wi-Fi connection can be notified to the PC 100.

When receiving the Result from the printer 200A in T350, the PC 100 executes communication with the printer 200B as in T300 to T324. In this communication, the IP address IPprb of the printer 200B included in the response signal received in T202 of FIG. 4 is used. As above, the PC 100 starts the processes for establishing a Wi-Fi connection between the printer 200B and the AP 80 after the Wi-Fi connection has been established between the printer 200A and the AP 80. Thus, it is possible to prevent the plurality of printers 200A and 200B from simultaneously executing the Network Address (i.e., the processes of T330 and T332) with the AP 80. In the event of this simultaneous execution, the AP 80 would undergo high communication load and processing load, and as a result, the AP 80 might not be able to establish a Wi-Fi connection with one of the printers. According to the present embodiment, the simultaneous execution can be prevented, and thus Wi-Fi connections can be suitably established between the respective printers 200A, 200B and the AP 80.

The printer 200B establishes a Wi-Fi connection with the AP 80 in T360 by executing processes as in T300 to T332. As a result, the printer 200B also joins the wireless LAN 8, in which the AP 80 operates as the parent station, as a child station. Thus, each of the printers 200A and 200B can receive print data, for example, from the terminal 10 via the AP 80 and print an image represented by the print data. Further, each of the printers 200A and 200B can communicate with a server (not shown) on the Internet 4 via the AP 80.

T370 is similar to T350. When receiving the Results from all of the printers 200A and 200B selected in T214 of FIG. 4, the PC 100 causes the display unit 114 to display a completion screen (not shown). Thereby, the user can acknowledge that the Wi-Fi connections have been established between the printers 200A, 200B and the AP 80. Further, the user disconnects the printers 200A and 200B from the wired LAN 6 by pulling out the cables from the printers 200A and 200B. Thereby the processes of the present embodiment are completed.

(Effects of Embodiment)

The PC 100 sends the search signal to the wired LAN 6 (T200 of FIG. 4) and receives the response signal including the IP address IPpra from the printer 200A (T201). Thus, the PC 100 can send, by using the wired LAN 6, the DPP starting request to the printer 200A with the IP address IPpra as the destination (T300 of FIG. 5) and receive the public key PKpra1 from the printer 200A in response to the DPP starting request being sent (T304). Then, the PC 100 can send, by using the wired LAN 6, the Auth Req in which the public key PKpra1 used to the printer 200A with the IP address IPpra as the destination (T310) and further can send, by using the wired LAN 6, the SC 210A for printer with the IP address IPpra as the destination (T324). Thereby the PC 100 can suitably cause the Wi-Fi connection to be established between the printer 200A and the AP 80 (T340). Similarly, the PC 100 receives the IP address IPprb from the printer 200B (T202 of FIG. 4). Thus, the PC 100 can execute the communication with the printer 200B by using the IP address IPprb (i.e., by using the wired LAN 6), as a result of which the PC 100 can suitably cause the Wi-Fi connection to be established between the printer 200B and the AP 80 (T360).

For example, a comparative example in which the PC 100 is not used will be considered. In the comparative example, the user of the terminal 10 causes the public key PKpra1, etc. to be displayed on the printers 200A and 200B and causes the terminal 10 to read the displayed public key PKpra1, etc. In this case, the terminal 10 can obtain the public key PKpra1, etc. of the printers 200A and 200B and send the Auth Req and the SC for printer to each of the printers 200A and 200B. However, according to the configuration of the comparative example, the user has to perform, on each one of the plurality of printers 200A and 200B, an operation for causing the public key to be displayed and an operation for reading the displayed public key. Thus, the user experiences an increased workload. Contrary to this, according to the present embodiment, the user does not have to perform these operations, thereby facilitating the establishment of the Wi-Fi connections between the plurality of printers 200A and 200B and the AP 80 by using the PC 100.

(Corresponding Relationships)

The PC 100, the terminal 10, the printer 200A, the printer 200B, and the AP 80 are respectively an example of a "first terminal device (or terminal device)", a "second terminal device", a "first communication device (or communication device)", a "second communication device", and a "external device". The printers 200A to 200D are an example of a "plurality of communication devices", and the printers 200A and 200B are an example of "two or more communication devices". The wired LAN 6 is an example of a "communication network". The wired interface 122 of the PC 100 is an example of a "first communication interface", a "second communication interface", and a "third communication interface" of the "first terminal device". The wired interface 222 of the printer 200A is an example of a "first communication interface" and a "second communication interface" of the "communication device". The Wi-Fi interface 220 of the printer 200A is an example of a "third communication interface" of the "communication device".

The IP address IPpra is an example of "first address information (or address information)" and a "first IP address (or IP address)". The IP address IPprb is an example of "second address information" and a "second IP address". The DPP starting request in T300 of FIG. 5 is an example of a "first sending request". The DPP starting request in T300 in connection with the printer 200B is an example of a "second sending request". The public key PKpra1 generated in T302 is an example of a "first public key (or public key)". The public key generated in T302 in connection with the printer 200B is an example of a "second public key". The Auth Req in T310 is an example of a "first authentication request (or authentication request)". The Auth Req in T310 in connection with the printer 200B is an example of a "second authentication request". The Auth Res in T312 is an example of a "first authentication response (or authentication response)". The Auth Res in T312 in connection with the printer 200B is an example of a "second authentication response". The SC 210A for printer in T324 is an example of "first connection information (or connection information)". The SC for printer in T324 in connection with the printer 200B is an example of "second connection information".

The response signal in T201 and the response signal in T202 of FIG. 4 are respectively an example of a "first response signal (or response signal)" and a "second response signal". The two node names "123" and "234" in the selection screen displayed in T210 are an example of "two or more pieces of device information". The node name "123" is an example of "specific device information". The DPP scheme is an example of a "predetermined wireless connection scheme". The SC for AP in T132 of FIG. 3 is an example of "third connection information". The public key PKte2, the private key skte2, and the Group ID "xxx" included in the specific information of T150 is an example of "specific information".

Corresponding relationships with respect to the "first terminal device" are as follows. The process of T152 in FIG. 3 is an example of "receive specific information". The process of T200, the process of T201, the process of T202, and the process of T212 in FIG. 4 are respectively an example of "send a search signal", "receive first address information", "receive second address information", and "cause the display unit to display a device selection screen". The process of T300, the process of T304, the process of T310, and the process of T324 of FIG. 5 are respectively an example of "send a first sending request", "receive a first public key", "send a first authentication request", and "send first connection information". The process of T300, the process of T304, the process of T310, and the process of T324 in connection with the printer 200B are respectively an example of "send a second sending request", "receive a second public key", "send a second authentication request", and "send second connection information".

Corresponding relationships with respect to the "communication device" are as follows. The process of T200 and the process of T201 in FIG. 4 are respectively an example of "receive a search signal" and "send address information". The process of T300, the process of T304, the process of T310, the process of T312, the process of T324, and the process of T340 in FIG. 5 are respectively an example of "receive a sending request", "send a public key", "receive an authentication request", "send an authentication response", "receive connection information", and "establish the wireless connection".

(Variant 1) In the case of receiving the search signal from the PC 100 in T200 of FIG. 4, the printer 200A may generate the public key PKpra1 and the private key skpra1 and send a response signal including the public key PKpra1 to the printer 200A in T201. That is, the PC 100 may receive a response signal including the IP address IPpra and the public key PKpra1 from the printer 200A in T201. In this case, T304 of FIG. 5 may be omitted. In general terms, "receive first address information" and "receive a first public key" executed by the "first terminal device" may include receiving the first address information and the first public key at different timings as in the above embodiment or receiving the first address information and the first public key at the same timing as in this variant. Further, "send address information" and "send a public key" executed by the "communication device" may include sending the address information and the public key at different timings or sending them at the same timing. In this variant, "send a first sending request" executed by the "first terminal device" and "receive a sending request" executed by the "communication device" may not be essential.

(Variant 2) The PC 100 and the printer 200A may belong to, for example, a Wi-Fi Direct (registered trademark) wireless network instead of the wired LAN 6. In this case, the PC 100 may receive the IP address IPpra and the public key PKpra1 from the printer 200A via the Wi-Fi interface 120. Further, the PC 100 may send the DPP starting request, the Auth Req, and the CO for printer to the printer 200A via the Wi-Fi interface 120. In this variant, the wireless network is an example of the "communication network". Further, the Wi-Fi interface 120 of the PC 100 is an example of the "first communication interface" of the "first terminal device" and the Wi-Fi interface 220 of the printer 200A is an example of the "first communication interface" of the "communication device".

(Variant 3) The PC 100 and the printer 200A may not execute the communication using the network layer and the higher layers of the OSI model (i.e., communication using an IP address) in T200 and T201 of FIG. 4. That is, the PC 100 and the printer 200A may execute the communication using the data link layer and the lower layers that that (i.e., communication not using an IP address). In this case, the PC 100 receives a wired MAC address which is a MAC address of the wired interface 222 of the printer 200A in T201 of FIG. 4 and sends the DPP starting request to the printer 200A with the wired MAC address as the destination in T300 of FIG. 5. In this variant, the wired MAC address is an example of the "first address information (or address information)".

(Variant 4) In T201 of FIG. 4, the PC 100 may further receive a wireless MAC address which is the MAC address of the Wi-Fi interface 220 of the printer 200A. In this case, in T310 to T324, the PC 100 may execute wireless communication using the wireless MAC address (i.e., the communication using only the data link layer and the lower layers of the OSI model) instead of the wired communication. That is, the PC 100 may send the Auth Req and the SC 210A for printer to the printer 200A via the Wi-Fi interface 120. In this variant, the Wi-Fi interface 120 of the PC 100 is an example of the "second communication interface" of the "first terminal device", and the Wi-Fi interface 220 of the printer 200A is an example of the "second communication interface" of the "communication device". In general terms, the "second communication interface" may be the same interface as the "first communication interface" as in the above embodiment or a different interface from the "first communication interface".

(Variant 5) The PC 100 may establish a Wi-Fi connection with the AP 80. Further, the AP 80 and each of the printers 200A and 200B may be connected to the wired network. In this case, the PC 100 sends the DPP starting request to the AP 80 using the wireless network in T300 of FIG. 5. As a result, the AP 80 sends the DPP starting request to the printer 200A using the wired network. In the following communication between the PC 100 and the printer 200A (T304, T310, etc.) as well, either the wireless network or the wired network is used. In general terms, the "communication network" may include only a wired communication pathway as in the above embodiment or may include both a wired communication pathway and a wireless communication pathway as in this variant.

(Variant 6) As in Case B of FIG. 4, the printer 200B may not be used. In this case, in FIG. 5, T300 to T332 in connection with the printer 200B may be omitted, and T360 and T370 may be also omitted. In this variant, "receive second address information", "send a second sending request", "receive a second public key", "send a second authentication request", and "send second connection information" executed by the "first terminal device" may be omitted.

(Variant 7) The printer 200A may, for example, periodically send information including the IP address IPpra to the wired LAN 6 without receiving the search signal from the PC 100 in T200 of FIG. 4. In this case, the PC 100 can receive the IP address IPpra from the printer 200A without sending the search signal to the wired LAN 6. In this variant, "send a search signal" executed by the "first terminal device" and "receive the search signal" executed by the "communication device" may be omitted.

(Variant 8) T350 of FIG. 5 may be omitted. In this case, after having sent the Config Res to the printer 200A in T324 of FIG. 5, the PC 100 may execute the communication of T300 to T324 with the printer 200B without receiving the Result from the printer 200A. That is, the PC 100 may execute the communication of T300 to T324 with the printer 200B before the Wi-Fi connection in T340 of FIG. 5 is established. In general terms, "send second connection information" executed by the "first terminal device" may include sending the second connection information to the second communication device before the first wireless connection is established.

(Variant 9) T212 and T214 of FIG. 4 may be omitted. In this variant, "cause the display unit to display a device selection screen" executed by the "first terminal device" may be omitted.

(Variant 10) The printers 200A, etc. that support the DPP scheme may be configured to send the response signals in T201, etc. of FIG. 4 to the PC 100, while the printer 200C that does not support the DPP scheme may be configured not to send the response signal in T203 to the PC 100. With the configuration in which only a printer that supports the DPP scheme sends a response signal, the response signal may not include the information indicating whether the DPP scheme is supported. In general terms, the "first terminal device" may not receive the response signal including the support information.

(Variant 11) The printers 200A, etc. that have not yet established a Wi-Fi connection with the AP 80 may be configured to send the response signals in T201, etc. of FIG. 4 to the PC 100, while the printer 200D that has already established the Wi-Fi connection with the AP 80 may be configured not to send the response signal in T204 to the PC 100. With the configuration in which only a printer that has not yet established a Wi-Fi connection with the AP 80 sends a response signal, the response signal may not include the information indicating whether a Wi-Fi connection with the AP 80 has been established. In general terms, the "first terminal device" may not receive the response signal including the established information.

(Variant 12) In Case B of FIG. 4, the PC 100 may display a selection screen that includes only the node name "123". In general terms, "cause the display unit to display a device selection screen" executed by the "first terminal device" may include causing the display unit to display a device selection screen in a case where the response signal is received only from the first communication device.

(Variant 13) Instead of the terminal 10, the PC 100 may execute the processes of T100 to T140 of FIG. 3. In this case, the processes of T150 and T152 may be omitted. In this variant, "receive a specific information" executed by the "first terminal device" may be omitted.

(Variant 14) The PC 100 may execute wireless communication such as Near Field Communication (NFC) communication, Bluetooth (registered trademark) (BT) communication, etc. instead of T150 and T152 of FIG. 3 to receive the public key PKte2, the private key skte2, and the Group ID "xxx" from the terminal 10. In this variant, a wireless communication interface such as an NFC interface or a BT interface is an example of the "third communication interface" of the "first terminal device". In another variant, the communication of the specific information between the PC 100 and the terminal 10 may be communication by way of an email including the password-protected specific information or network communication using Hyper Text Transfer Protocol Secure (HTTPS) (i.e., communication using the wired LAN 6 and the wireless LAN 8). Here, the network communication as above may, for example, be implemented by the terminal 10 operating as a client and the PC 100 operating as a server.

(Variant 15) The "first communication device (or communication device)" may not be a printer, and may be a device of another type such as a scanner, a multi-function device, a portable terminal, a PC, a server, or the like.

(Variant 16) The "external device" may not be the AP 80, and may, for example, be the PC 100. That is, in this variant, a Wi-Fi connection is established between the PC 100 and the printer 200A.

(Variant 17) In the embodiment as above, the processes of FIGS. 3 to 5 are implemented by software (i.e., the programs 40, 42, 140, 142, 240). Instead, at least one of these processes may be implemented by hardware such as a logic circuit.

What is claimed is:

1. A non-transitory computer-readable recording medium storing computer-readable instructions for a first terminal device, wherein the first terminal device comprises one or more communication interfaces, a display, and a processor, and the computer-readable instructions, when executed by the processor of the first terminal device, cause the first terminal device to:

send a search signal to a pre-established, wired communication network to which the first terminal device and a first communication device belong and by using a network layer and higher layers of the Open Systems Interconnection (OSI) model via a first communication interface of the one or more communication interfaces; and in a case where a response signal is received from each of a plurality of communication devices via the first communication interface, cause the display to display a device selection screen that includes two or more pieces of device information corresponding to two or more communication devices among the plurality of communication devices, wherein the two or more communication devices are senders of the response signals including supported information, the device selection screen does not include device information corresponding to a communication device that is a sender of the response signal that does not include the supported information, and the supported information indicates that a communication device that is a sender of the response signal supports a predetermined wireless connection scheme for communicating an authentication request in which a public key is used, the computer-readable instructions, when executed by the processor of the first terminal device, further cause the first terminal device to:

by using the pre-established, wired communication network and by using the network layer and higher layers of the OSI model, receive first address information which is a first IP address of the first communication device from the first communication device of the plurality of communication devices via the first communication interface;

receive a first public key of the first communication device from the first communication device via the first communication interface by using the pre-established, wired communication network and by using the network layer and higher layers of the OSI model;

in a case where specific device information corresponding to the first communication device is selected from the two or more pieces of device information in the device selection screen, and the first address information and the first public key are received from the first communication device, send a first authentication request in which the first public key is used to the first communication device with the first address information as a destination via the first communication interface by using the pre-established, wired communication network and by using the network layer and higher layers of the OSI model; and in a case where a first authentication response is received from the first communication device via the first communication interface by using the pre-established, wired communication network and by using the network layer and higher layers of the OSI model in response to the first authentication request being sent to the first communication device send first connection information to the first communication service with the first address information as a destination via the first communication interface by using the pre-established, wired communication network and by using the network layers and higher layers of the OSI model, wherein the first connection information is used by the first communication device to establish a first wireless connection between the first communication device and an external device.

2. The non-transitory computer-readable recording medium as in claim 1,
wherein the computer-readable instructions, when executed by the processor of the first terminal device, further cause the first terminal device to:
by using the pre-established, wired communication network to which a second communication device of the plurality of communication devices different from the first communication device further belongs, and by using the network layer and higher layers of the OSI model, receive second address information which is a second IP address of the second communication device from the second communication device via the first communication interface;
receive a second public key of the second communication device from the second communication device via the first communication interface by using the pre-establisher, wired communication network and by using the network layer and higher layers of the OSI model;
in a case where specific device information corresponding to the second communication device is selected from the two or more pieces of device information in the device selection screen, and the second address information and the second public key are received from the second communication device, send a second authentication request in which the second public key is used to the second communication device with the second address information as a destination via the first communication interface by using the pre-established, wired communication network and by using the network layer and higher layers of the OSI model; and
in a case where a second authentication response is received from the second communication device via the first communication interface by using the pre-established, wired communication network and by using the network layer and higher layers of the OSI model in response to the second authentication request being sent to the second communication device, send second connection information to the second communication device with the second address information as a destination via the first communication interface by using the pre-established, wired communication network, and by using the network layer and higher layers of the OSI model, wherein the second connection information is used by the second communication device to establish a second wireless connection between the second communication device and the external device.

3. The non-transitory computer-readable recording medium as in claim 2, wherein the first address information is received by receiving a first response signal including including the first address information from the first communication device via the first communication interface by using the pre-established, wired communication network and by using the network layer and higher layers of the OSI model in response to the search signal being sent, and
the second address information is received by receiving a second response signal including the second address information from the second communication device via the first communication interface by using the pre-established, wired communication network and by using the network layer and higher layers of the OSI model in response to the search signal being sent.

4. The non-transitory computer-readable recording medium as in claim 2, wherein
after the first wireless connection has been established between the first communication device and the external device, the second connection information is sent to the second communication device.

5. The non-transitory computer-readable recording medium as in claim 1, wherein
the device selection screen includes the two or more pieces of device information corresponding to two or more communication devices that are senders of the response signals that include the supported information but do not include established information,
the device selection screen does not include device information corresponding to a communication device that is a sender of the response signal that includes the established information, and
the established information indicates that a communication device that is a sender of the response signal has already established a wireless connection with the external device.

6. The non-transitory computer-readable recording medium as in claim 1, wherein
in a case where the response signal is received only from the first communication device in response to the search signal being sent, the device selection screen is not displayed, and
in the case where the response signal is received only from the first communication device, the first authentication request is sent to the first communication device without the specific device information being selected in the device selection screen.

7. The non-transitory computer-readable recording medium as in claim 1, wherein
the pre-established, wired communication network includes a wired communication pathway.

8. The non-transitory computer-readable recording medium as in claim 7, wherein
the first communication interface is a wired interface for wired communication.

9. The non-transitory computer-readable recording medium as in claim 1, wherein
the computer-readable instructions, when executed by the processor of the first terminal device, further cause the first terminal device to:
receive specific information from a second terminal device different from the first terminal device via a third communication interface of the one or more communication interfaces, wherein the second terminal device has generated third connection information by using the specific information and has already sent the generated third connection information to the external device which is an access point, and the third connection information is used by the external device to establish the first wireless connection between the first communication device and the external device,
wherein the first connection information is generated by using the specific information and the first connection information generated is sent to the first communication device.

10. A non-transitory computer-readable recording medium storing computer-readable instructions for a first terminal device, wherein
the first terminal device comprises one or more communication interfaces and a processor, and the computer-readable instructions, when executed by the processor of the first terminal device, cause the first terminal device to:

send a search signal to a pre-established, wired communication network to which the first terminal device and a first communication device belong and by using a network layer and higher layers of Open Systems Interconnection (OSI) model via a first communication interface of the one or more communication interfaces; and in a case where a response signal is received from each of a plurality of communication devices via the first communication interface, cause the display to display a device selection screen that includes two or more pieces of device information corresponding to two or more communication devices among the plurality of communication devices, wherein two or more communication devices are senders of the response signals including supported information, the device selection screen does not include device information corresponding to a communication device that is a sender of the response signal that does not include the supported information, and the supported information indicates that a communication device that is a sender of the response signal supports a predetermined wireless connection scheme for communicating an authentication request in which a public key is used, the computer-readable instructions, when executed by the processor of the first terminal device, further cause the first terminal device to:

by using the pre-established, wired communication network and by using the network layer of the OSI model, receive first address information from the first communication device of the plurality of communication devices via the first communication interface;

in a case where the first address information is received from the first communication device, send a first sending request to the first communication device with the first address information as a destination via the first communication interface by using the pre-established, wired communication network and by using the network layer of the OSI model, wherein the first sending request is a signal for requesting the first communication device to send a first public key of the first communication device;

in response to the first sending request being sent to the first communication device, receive the first public key from the first communication device via the first communication interface by using the pre-established, wired communication network and by using the network layer of the OSI model;

in a case where specific device information corresponding to the first communication device is selected from the two or more pieces of device information in the device selection screen, and the first public key is received from the first communication device, send a first authentication request in which the first public key is used to the first communication device via a second communication interface of the one or more communication interfaces using the pre-established, wired communication network and by using the network layer of the OSI model; and in a case where a first authentication response is received from the first communication device via the second communication interface in response to the first authentication request being sent to the first communication device, send first connection information to the first communication device via the second communication interface using the pre-established, wired communication network and by using the network layer of the OSI model, wherein the first connection information is used by the first communication device to establish a first wireless connection between the first communication device and an external device.

11. The non-transitory computer-readable recording medium as in claim 10, wherein the second communication interface is the first communication interface.

12. The non-transitory computer-readable recording medium as in claim 10, wherein the first address information is a first IP address of the first communication device.

13. The non-transitory computer-readable recording medium as in claim 10, wherein the computer-readable instructions, when executed by the processor of the first terminal device, further cause the first terminal device to:

by using the pre-established, wired communication network to which a second communication device of the plurality of communication devices different from the first communication device further belong and by using the network layer of the OSI model, receive second address information of the second communication device from the second communication device via the first communication interface;

in a case where the second address information is received from the second communication device, send a second sending request to the second communication device with the second address information as a destination via the first communication interface by using the pre-established, wired communication network and by using the network layer of the OSI model, wherein the second sending request is a signal for requesting the second communication device to send a second public key of the second communication device;

in response to the second sending request being sent to the second communication device, receive the second public key from the second communication device via the first communication interface by using the pre-established, wired communication network and by using the network layer of the 081 model;

in a case where specific device information corresponding to the second communication device is selected from the two or more pieces of device information in the device selection screen, and the second public key is received from the second communication device, send a second authentication request in which the second public key is used to the second communication device via the second communication interface; and in a case where a second authentication response is received from the second communication device via the second communication interface in response to the second authentication request being sent to the second communication device, send second connection information to the second communication device via the second communication interface, wherein the second connection information is used by the second communication device to establish a second wireless connection between the second communication device and the external device.

14. A communication device comprising:
one or more communication interfaces; and
a controller,
wherein the controller is configured to:
by using a pre-established, wired communication network to which the communication device and a terminal device belong, receive a search signal from the terminal device via a first communication interface of the one or more communication interfaces;
in a case where the search signal is received from the terminal device, send a response signal to the terminal device via the first communication interface, wherein the response signal includes address information which is an IP address of the communication device and supporting information which indicates that the communication device supports a predetermined wireless connection scheme for communicating an authentication request in which a public key is used, send the public key of the communication device to the terminal device via the first communication interface by using the pre-established, wired communication network and by using a network layer and higher layers of the Open Systems Interconnection (OSI) model;
in a case where the response signal including the address information and the supported information and the public key are sent to the terminal device, receive an authentication request in which the public key is used from the terminal device via the first communication interface by using the pre-established, wired communication network and by using the network layer and higher layers of the OSI model, wherein the authentication request is sent with the address information as a destination;
in a case where the authentication request is received from the terminal device, send an authentication response to the terminal device via the first communication interface by using the pre-established, wired communication network and by using the network layer and higher layers of the OSI model;
in a case where the authentication response is sent to the terminal device, receive connection information from the terminal device via the first communication interface by using the pre-established, wired communication network and by using the network layer and higher layers of the OSI model, wherein the connection information is sent with the address information as a destination, and wherein the connection information is used by the communication device to establish a wireless connection between the communication device and an external device; and
in a case where the connection information is received from the terminal device, establish the wireless connection between the communication device and the external device by using the connection information via a third communication interface of the one or more communication interfaces.

15. The communication device as in claim 14, wherein
the authentication request is received from the terminal device in a case where the response signal that does not include established information is sent to the terminal device,
the authentication request is not received in a case where the response signal that includes the established information is sent to the terminal device, and
the established information indicates that the communication device has already established a wireless connection with the external device.

16. The communication device as in claim 14, wherein
the pre-established, wired communication network includes a wired communication pathway.

17. The communication device as in claim 16, wherein
the first communication interface is a wired interface for wired communication, and
the third communication interface is a wireless interface for wireless communication according to a Wi-Fi standard.

18. A communication device comprising:
one or more communication interfaces; and
a controller,
wherein the controller is configured to:
by using a pre-established, wired communication network to which the communication device and a terminal device belong, receive a search signal from the terminal device via a first communication interface of the one or more communication interfaces;
in a case where the search signal is received from the terminal device, send a response signal to the terminal device via the first communication interface, wherein the response signal includes address information of the communication device and supported information which indicates that the communication device supports a predetermined wireless connection scheme for communicating an authentication request in which a public key is used;
in a case where the response signal including the address information and the supported information is sent to the terminal device, receive a sending request from the terminal device via the first communication interface by using the pre-established, wired communication network and by using a network layer of the Open Systems Interconnection (OSI) model, wherein the sending request is sent with the address information as a destination, and wherein the sending request is a signal for requesting the communication device to send a public key of the communication device;
in response to the sending request being received from the terminal device, send the public key to the terminal device via the first communication interface by using the pre-established, wired communication network and by using the network layer of the OSI model;
in a case where the public key is sent to the terminal device, receive an authentication request in which the public key is used from the terminal device via a second communication interface of the one or more communication interfaces using the pre-established, wired communication network and by using the network layer of the OSI model;
in response to the authentication request being received from the terminal device, send an authentication response to the terminal device via the second communication interface using the pre-established, wired communication network and by using the network layer of the OSI model;
in a case where the authentication response is sent to the terminal device, receive connection information from the terminal device via the second communication interface using the pre-established, wired, communication network and by using the network layer of the OSI model, wherein the communication information is used by the communication device to establish a wireless connection between the communication device and an external device; and in a case where the connection information is received from the terminal device, establish the wireless connection between the communication device and the external device by using the connection information via a third communication interface of the one or more communication interfaces.

19. The communication device as in claim 18, wherein the second communication interface is the first communication interface.

20. The communication device as in claim 18, wherein the address information is an IP address of the communication device.

\* \* \* \* \*